United States Patent [19]

Kohzai et al.

[11] 4,374,350
[45] Feb. 15, 1983

[54] CONTROL SYSTEM FOR STOPPING SPINDLE AT PREDETERMINED ROTATIONAL POSITION

[75] Inventors: Yoshinori Kohzai; Yoshiki Fujioka; Naoto Ota, all of Hino, Japan

[73] Assignee: Fujitsu Fanuc Limited, Tokyo, Japan

[21] Appl. No.: 216,836

[22] Filed: Dec. 15, 1980

[30] Foreign Application Priority Data

Dec. 31, 1979 [JP] Japan .................................. 54-172681

[51] Int. Cl.³ ............................................. G05B 11/18
[52] U.S. Cl. ..................................... 318/590; 318/616
[58] Field of Search ............... 318/590, 616, 591, 615, 318/561

[56] References Cited

U.S. PATENT DOCUMENTS

| 3,565,370 | 2/1971 | Moller | 318/616 X |
| 3,895,279 | 7/1975 | Suzuki et al. | 318/590 X |
| 4,016,469 | 4/1977 | Lanni et al. | 318/590 |
| 4,297,624 | 10/1981 | Komiya | 318/590 X |
| 4,314,185 | 2/1982 | Schneider | 318/590 X |
| 4,338,555 | 7/1982 | Rhodes | 318/616 X |

Primary Examiner—B. Dobeck
Attorney, Agent, or Firm—Staas & Halsey

[57] ABSTRACT

A system employed in a machine tool of the type in which a gear mechanism disposed between the spindle and spindle motor transmits the rotational motion of the motor to the spindle. The system allows the spindle to be brought to a stop at a predetermined rotational position in a shorter period of time when the gear mechanism is set in low gear, that is, while the rotational speed of the motor is being reduced by the gear mechanism as it is being transferred to the spindle. This permits the spindle to be stopped at the predetermined position in the same amount of time which is required when no reduction in speed takes place between the motor and spindle. When the spindle arrives at a region where it is to be controlled in order to stop at the predetermined rotational position, a position deviation signal for guiding the spindle to the position is applied as an input signal to a speed control loop for controlling spindle rotation. The position deviation signal varies in dependence upon the gear ratio of the spindle gear mechanism. Positioning gain, which is obtained by dividing the speed of the spindle motor by an amount of spindle motor rotation that depends upon the position deviation of the spindle; is controlled so that it remains constant regardless of the speed change ratio between the spindle and spindle motor as determined by the gear mechanism.

15 Claims, 19 Drawing Figures

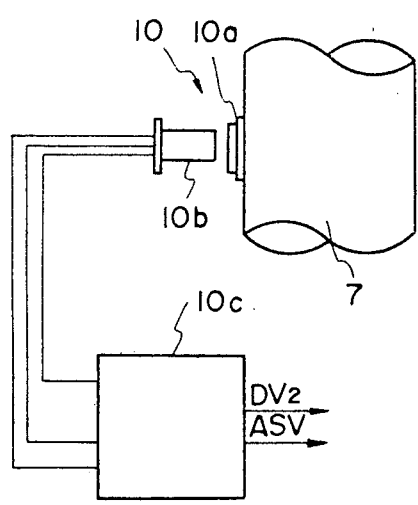
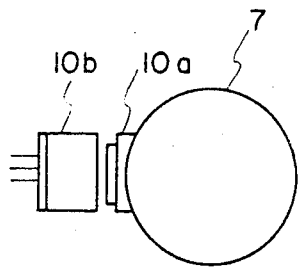
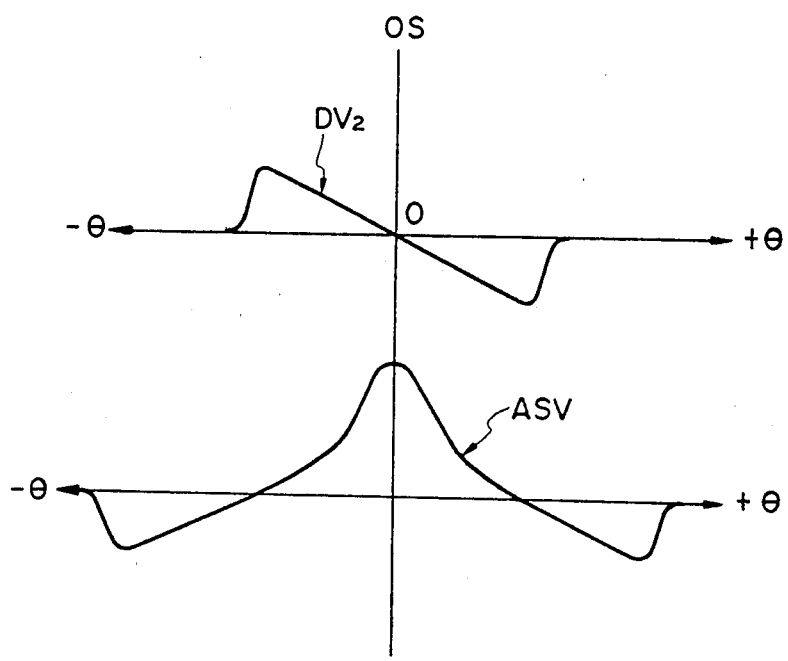

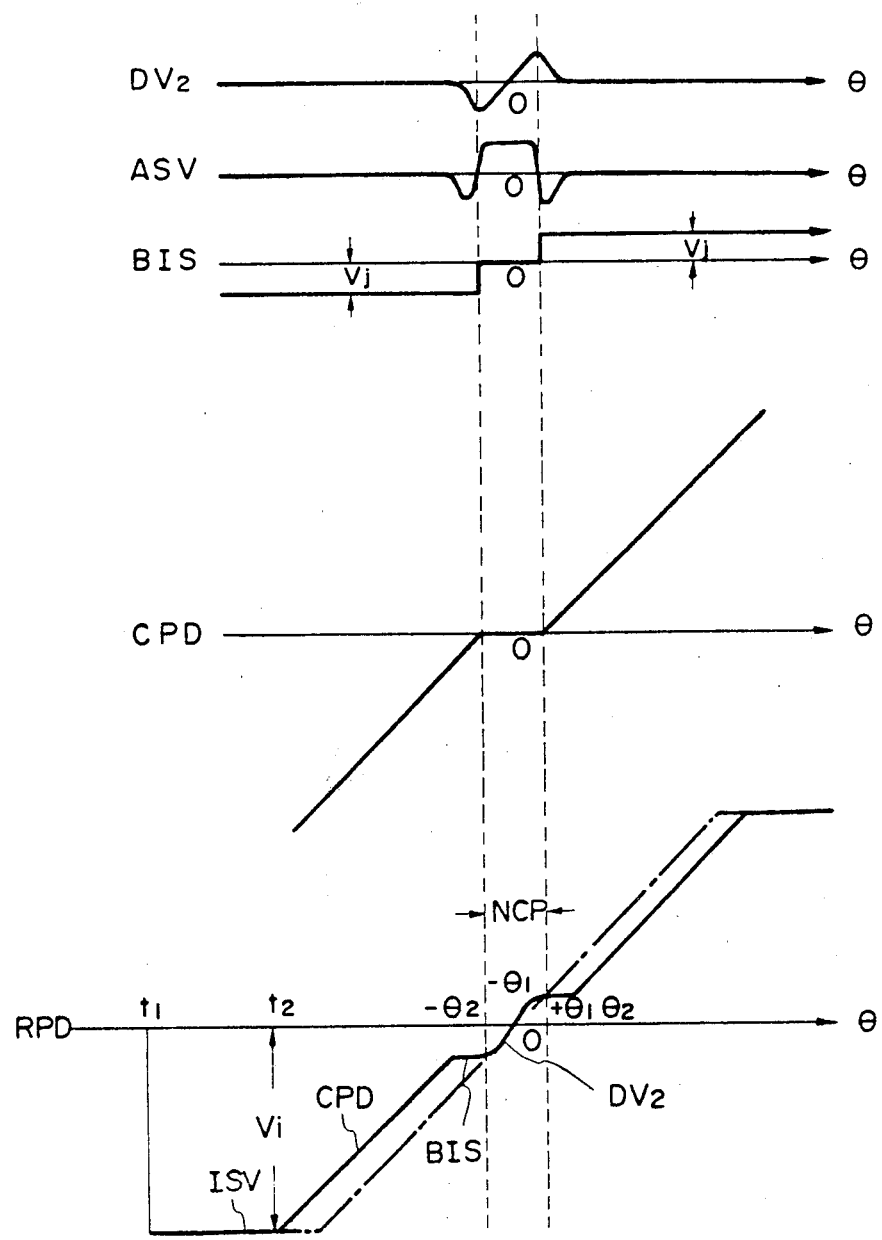

CONTROL SYSTEM FOR STOPPING SPINDLE AT PREDETERMINED ROTATIONAL POSITION

CROSS-REFERENCES TO RELATED APPLICATIONS

This application is related to the following applications:

(1) U.S. Application Ser. No. 216,835 by Kohzai et al. entitled "Control System for Stopping Spindle at Predetermined Rotational Position"; and (2) U.S. Application Ser. No. 216,837 by Kohzai et al. entitled "Control System of Stopping Spindle at Predetermined Rotational Position"; both of the above applications are assigned to the assignee of the present application.

BACKGROUND OF THE INVENTION

This invention relates to a control system for stopping a spindle at a predetermined rotational position, and more particularly to a control system of the type described, which permits the control operation to be performed in a short period of time by rendering the positioning gain approximately constant regardless of the speed change ratio, between the spindle and a motor, as determined by a speed change mechanism.

In an automatic tool change mechanism of a machine tool, a key is provided on the spindle of the machine tool and a keyway is formed in each of the various tools that are employed. In order to mate the spindle and tool with each other smoothly, the spindle must be positioned and stopped accurately in such a manner as to bring the key and keyway into perfect alignment. There is a similar requirement in machine tools for cutting work, and for boring work in particular. Here it is desirable to employ a boring bar having a large diameter in order to eliminate chatter, and to stop a specified point on the spindle at a predetermined rotational position in an accurate manner in order that the cutting operation may proceed in a stable and rigid fashion.

Mechanical stopping mechanisms that rely upon a pin or brake are generally employed to stop the spindle at the predetermined position. However, such mechanisms experience wear with long use, particularly of the pin and brake shoe portions, so that it becomes progressively more difficult to stop the spindle at the correct position. These mechanisms also require troublesome maintenance and inspections.

Accordingly, the assignee of present invention has already proposed a system, disclosed in copending U.S. applications by Kohzai et al. with Ser. No. 190,659 entitled "Spindle Rotation Control System" and by Fujioka with Ser. No. 215,631 entitled "Control System for Stopping Spindle at Predetermined Rotational Position" both assigned to the assignee of the present application, for stopping a specified point on spindle at a predetermined rotational position through purely electrical means without relying upon a mechanical brake or the like. Although the already proposed system succeeds in stopping the spindle with a high degree of accuracy, a considerable amount of time may be required to accomplish the stopping if the speed change ratio between the spindle and the spindle driving motor is high. This naturally results in a poorer working efficiency.

Approximately 90% of the machine tools of the ordinary variety employ a speed change mechanism, such as a gear mechanism between the motor and spindle, so that machining can be performed while switching between a high gear setting (reduction ratio low) and a low gear setting (reduction ratio high). The high gear setting is used for the light machining of wood or light metals such as aluminum, whereas the low gear setting is employed for the heavy machining of steel or the like.

In the already proposed control system for stopping a spindle at a predetermined rotational position, the control mode for stopping the spindle begins after the generation of a single for one spindle revolution, with the specified point on the spindle being stopped correctly at the predetermined position after the one revolution. To accomplish this the gear ratio between the spindle and motor is set to high gear (1:1) to enable the spindle to be stopped after a single revolution of the motor. In the low gear setting, however, where the motor-to-spindle ratio is typically 4:1, four revolutions of the motor are required to bring the spindle to a stop. Thus the time required for the stopping operation in low gear is at least four times that of high gear, so that the proportion of time spent for actual machining work decreases. The inevitable result is a decline in working efficiency.

In general, with the high gear setting in which the gear ratio is 1:1, load inertia increases and speed loop gain decreases, while the opposite is true in the low gear setting in which the gear ratio is 4:1, as mentioned above. In other words, when applying the orientation control operation to stop the spindle at the predetermined position, the low gear setting allows the motor speed to be increased in comparison with the speed under a high gear setting.

SUMMARY OF THE INVENTION

Accordingly, it is an object of the present invention to provide a control system which permits a spindle to be stopped at a predetermined rotational position in a shorter period of time even if the speed change ratio is high in a machine tool of the type in which the rotational speed of a spindle motor is changed through a speed change mechanism before being transmitted to the spindle.

It is another object of the present invention to provide a control system which permits a spindle to be stopped at a predetermined rotational position within a fixed period of time, regardless of the speed change ratio, by allowing positioning gain, which is obtained by dividing the rotational speed of the spindle motor by a residual amount of spindle motor rotation, to be set to a substantially constant value regardless of the speed change ratio.

It is a further object of the present invention to provide a control system which permits a spindle to be stopped at a predetermined rotational position without overshooting the predetermined rotational position even when the positioning gain is varied in accordance with the speed change ratio.

Other features and advantages of this invention will be apparent from the following description taken in conjunction with the accompanying drawings.

BRIEF DESCRIPTION OF THE DRAWINGS

FIGS. 3(a) and 3(b) are illustrative views showing the arrangement of a position sensor, and FIG. 3(c) is a waveform diagram of output signals associated therewith;

DESCRIPTION OF THE PREFERRED EMBODIMENT

Figure 1A:
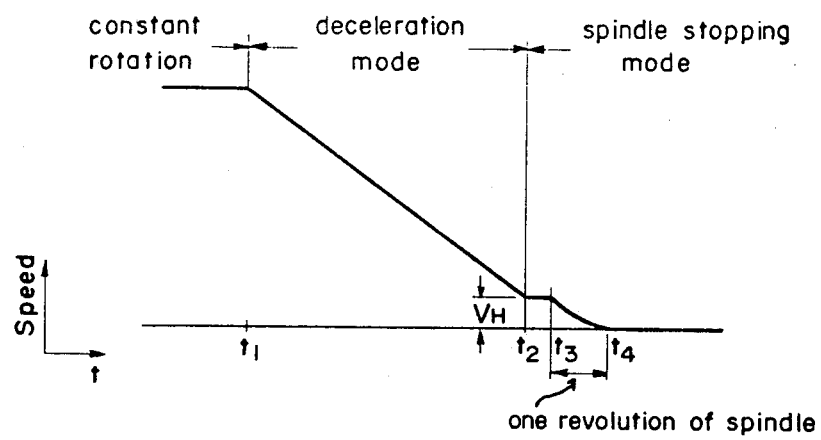
FIGS. 1(a) and 1(b) are illustrative views which are useful in describing positioning gain as well as the principle of the present invention.
Figure 1B:
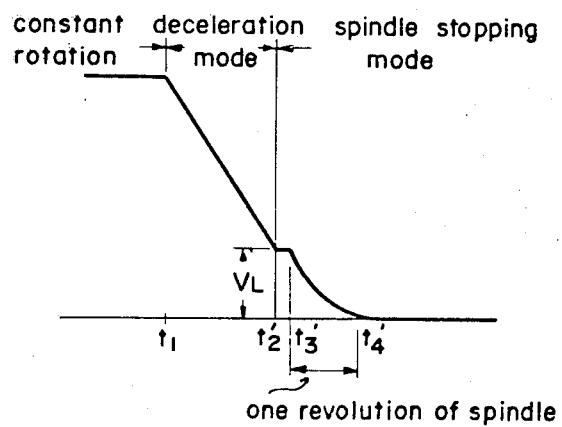

Reference will first be had to FIG. 1 to describe positioning gain as well as the principle of the present invention. FIGS. 1(a) and 1(b) are illustrative views of high and low gear situations, respectively.

FIG. 1(a) shows that, when in a high hear setting, a spindle is rotating at a predetermined speed until a time $t_1$ since the particular machine tool is performing cutting work or the like up to this time. When an orientation command is issued at time $t_1$, the rotational speed of the spindle is reduced and reaches a preset speed $V_H$ at time $t_2$. The spindle rotates at this speed until the generation of a signal for one spindle revolution, as will be described later. If this signal is generated at time $t_3$, a spindle control operation for stopping the spindle begins at this point and continues until, at time $t_4$, a specified point on the spindle is stopped at the predetermined position.

On the other hand, in FIG. 1(b) which shows the conditions for operation in low gear, the rotational speed of the spindle is reduced and reaches a preset speed $V_L$ at time $t_2'$ following the issuance of the orientation command at time $t_1$. The spindle rotates at the preset speed until the generation of the signal for one spindle revolution. If the signal for one spindle revolution is generated at time $t_3'$, a spindle control operation for stopping the spindle begins at this point and continues until, at time $t_4'$, a specified point on the spindle is stopped at the predetermined position.

If the set speed $V_H$, while in high gear, and the set speed $V_L$, while in low gear, are equal, then, because the gear ratio is 1:1 in high gear and 4:1 in low gear, the period of time from the generation of the one revolution signal until the completion of the spindle stopping control operation will be at least four times longer in low gear than in high gear. Accordingly, if the value of $V_L$ is set to be four times that of $V_H$, it may be presumed that the time required to stop the spindle in low gear will be equal to that required to accomplish the same in high gear. This means that in order to make the positioning gain in high gear the same as that in low gear requires that the positioning gain during the spindle stopping control operation be defined as $V/\theta$. Where $V$ represents the speed of the motor in radians per second, and $\theta$, also measured in radians, represents the amount through which the spindle motor rotates until a positional deviation, between a specified point on the spindle and a predetermined rotational position, is reduced to zero. The positional deviation mentioned here arises when the motor, which has been rotating at a constant speed, is instructed to decrease the speed in order to stop the spindle. The motor is then driven so as to reduce the positional deviation to zero. Thus, the positioning gain $V/\theta$ is generally represented by dividing a command speed by a positional deviation which is measured from a predetermined stopping position. If we let $n_H$ represent the number of motor revolutions needed to revolve the spindle once in high gear, and let $n_L$ represent the number of motor revolutions needed to revolve the spindle once in low gear, then the positioning gain PG(H) for high gear and the positioning gain PG(L) for low gear, at the time of a control operation for stopping the spindle at the predetermined rotational position, with be expressed by the following:

$$PG(H) = V_H/2\pi n_H (\sec^{-1})$$

$$PG(L) = V_L/2\pi n_L (\sec^{-1}).$$

In order to set the value of $V_L$ equal to a value which is, for example, four times that of $V_H$, an arrangement in accordance with the present invention is constructed so adapted that the gain of the positioning control system can be changed in both high and low gear when the spindle is being subjected to positioning control to stop it at the predetermined position.

Figure 2:
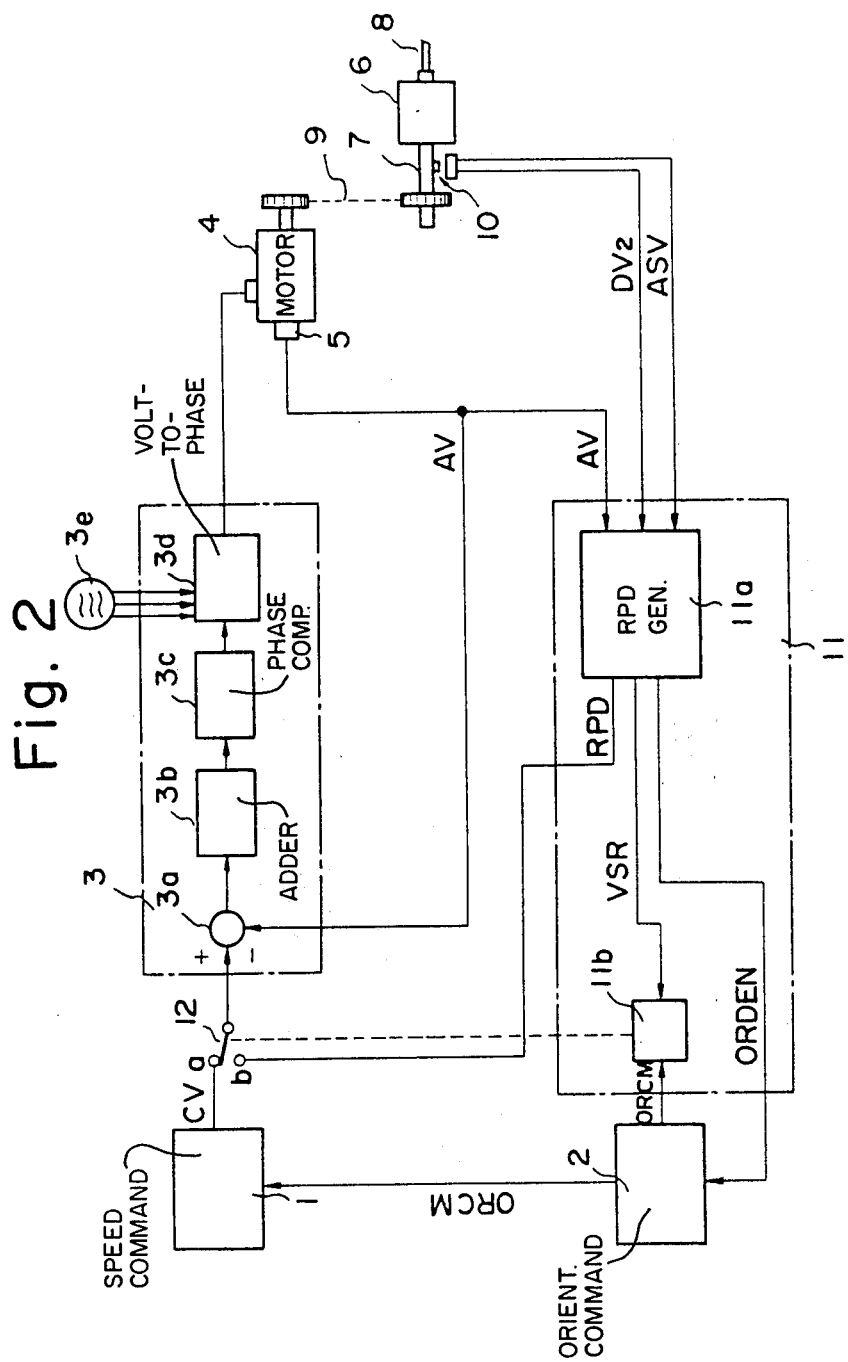
FIG. 2 is a circuit block diagram of a control apparatus for stopping a spindle at a predetermined rotational position, and which embodies the system of the present invention.

Next, reference will be had to FIG. 2 which shows a block diagram of a spindle control apparatus to which the present invention may be applied. There are included a speed command circuit 1 for generating a speed command CV, and an orientation command circuit 2 for generating an orientation command ORCM. A speed control circuit 3 includes an adder 3a, a phase compensating circuit 3b connected to the output of the adder, a voltage-to-phase converter 3c connected to the output of the phase compensating circuit, and a thyristor converter 3d connected to the output of the converter 3c. The adder 3a is constructed so that it generates both (1) a difference voltage, representative of a speed deviation, which is the difference between the voltage of the speed command CV and the voltage of an actual speed signal, during a speed control operation, and (2) and generates a difference voltage between a rotational position deviation RPD and the actual speed AV. The phase compensating circuit 3b subjects the output voltage of the adder 3 to a phase compensation by advancing or retarding the phase of the output of the adder 3a. The voltage-to-phase converter 3c controls the firing angle of each thyristor in the thyristor circuit 3d in dependence upon the output voltage of the phase compensating circuit 3b. The thyristor converter 3d operates, in dependence upon the controlled firing angles of its thyristors, to convert the three-phase voltage from a three-phase power supply 3e into a direct current. The direct current is used to vary the value of the voltage applied to a DC motor which will be described later, thereby regulating the speed at which the motor rotates. The DC motor 4 serves as a spindle drive motor. As the DC motor 4 rotates, a tachometer generator 5 generates a voltage in dependence upon the motor speed. The rotational motion of the DC motor 4 is transmitted through a gear mechanism 9 to a spindle 7. The gear mechanism 9 is capable of being changed between high and low gear by means of an externally applied changeover signal. The spindle 7 is coupled to a spindle mechanism 6 which holds a tool 8. A rotational position sensor 10 is constructed so that it will detect the rotational position of the spindle 7 and comprises a magnetic body 10a which is attached to the spindle 7, a sensing portion 10b which is attached to a stationary portion of the machine such as the spindle bearing portion, for sensing the magnetic body 10a, and an electrical circuit 10c, as shown in FIGS. 3a and 3b. the position sensor 10 generates a fine position deviation signal $DV_2$ and an approach signal ASV, shown in FIG. 3c, which vary in dependence upon the rotational deviation of the spindle 7 with respect to a predetermined rotational position OS at which a specified point on the spindle is to be stopped.

Referring again to FIG. 2, an orientation control circuit 11 includes a rotational position deviation signal generating circuit 11a which receives the fine position deviation signal $DV_2$, the approach signal ASV, and the signal AV, indicative of the actual speed of the spindle, provided by the tachometer 5. The rotational position deviation signal generating circuit 11a generates the rotational position deviation signal RPD which serves as a spindle speed command signal when an operation which is for stopping the spindle at the predetermined rotational position is being carried out. The rotational position deviation signal generating circuit 11a also generates an orientation completion signal ORDEN and a signal VSR indicating that the prescribed speed has been reached. The orientation control circuit 11 also includes also a loop changeover circuit 11b for actuating a loop changeover switch 12 in dependence upon both the orientation command signal ORCM output by the orientation command circuit 2 and the signal VSR output by the position deviation signal generating circuit 11a.

Figure 4A:
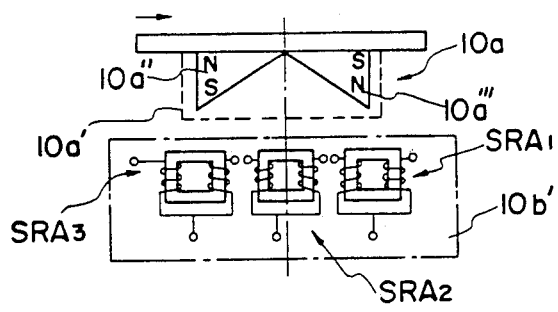
FIGS. 4(a) and 4(b) are illustrative views showing the internal structure of the position sensor of FIG. 3.
Figure 4B:
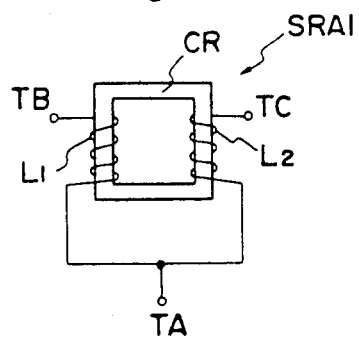

Reference will now be made to FIGS. 3(a) and 3(b) for a complete understanding of the structure and operation of the position sensor 10, FIG. 3(a) showing a front view and FIG. 3(b) a plan view of an example in which the magnetic body 10a is mounted on the spindle 7. It should be noted that the sizes of the magnetic body 10a and sensing portion 10b are exaggerated in comparison with the size of the spindle 7. The magnetic body 10a is mounted on the spindle 7 so that the center of the magnetic body 10a will coincide with the center of the sensing portion 10b when a specified point on the spindle is located at the predetermined rotational position at which the spindle is desired to be stopped. As the spindle 7 rotates the electrical circuit 10c generates the fine position deviation signal $DV_2$ and the approach signal ASV having the waveforms shown in FIG. 3(c). The magnetic body 10a, as shown in FIG. 4(a), has magnets 10a'', 10a''', possessed of a triangular cross-section, mounted in a case 10a' in such a manner that the intensity of the magnetic field changes from S to N in the direction of spindle rotation, i.e., in the direction of the arrow. The sensing portion 10b is mounted on a mechanically stationary portion of the machine so as to confront the magnetic body 10a, and includes three saturable reactors $SRA_1$, $SRA_2$ and $SRA_3$ included in a case 10b' and aligned in the direction of spindle rotation, as shown in FIG. 4(a). Each of the saturable reactors comprises coils $L_1$ and $L_2$ wound on a core CR, as shown in FIG. 4(b). The coils $L_1$ and $L_2$ on each core have the same number of turns and are wound in opposite directions. The coils on each core share a common terminal TA to which a high-frequency signal is applied, and signals which are dependent upon with the rotational position of the magnetic body 10a are obtained at the terminals TB and TC of the respective coils.

Figure 5:
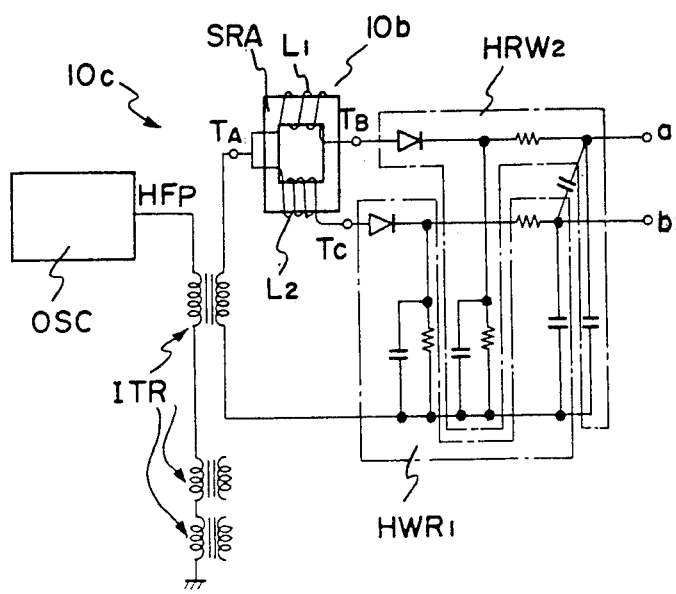
FIG. 5 is a circuit diagram of a portion of the position sensor of FIG. 3.

Included in the electrical circuit 10c is a circuit shown in FIG. 5, associated with a corresponding one of the saturable reactors SRA for processing the signal generated by the respective reactor. Included in the electrical circuit 10c are a pulse oscillator OSC for generating a 100 kHz high-frequency signal, an isolating transformer ITR, and half-wave rectifiers $HWR_1$ and $HWR_2$. The saturable reactor SRA is excited by the high-frequency pulse signal HFP through the intermediary of the isolating transformer ITR. As a result, an analog output voltage is obtained across the terminals a and b of the circuit, which analog output voltage is proportional to the external magnetic field $H_{ext}$. The external magnetic field strength varies in dependence upon the rotational position of the magnetic body 10a.

Figure 6A:
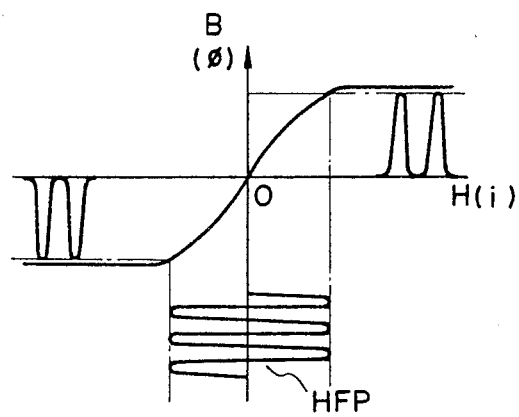
FIGS. 6(a), 6(c) and 6(d) are B-H graphs and 6(b) is an are illustrative view which are useful in describing the operation of the position sensor.
Figure 6B:
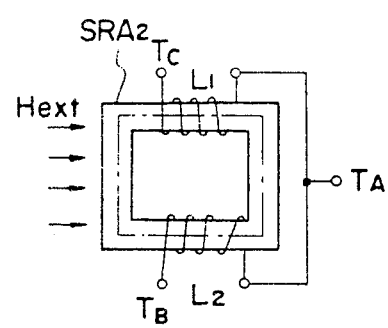
Figure 6C:
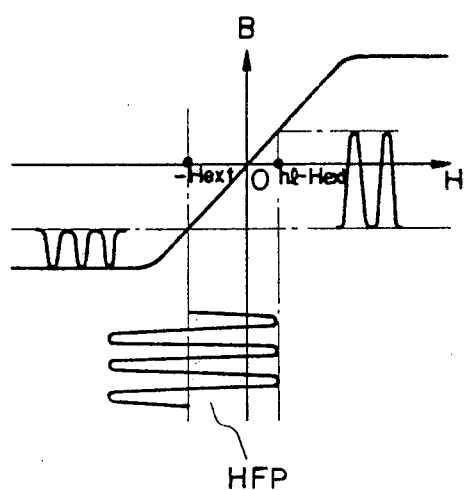
Figure 6D:
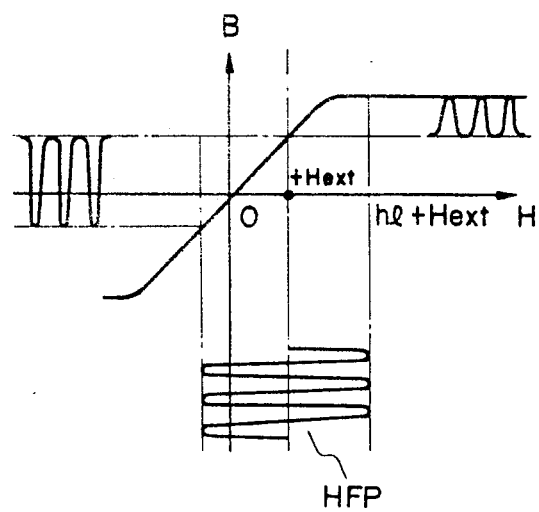

Next, referring to FIG. 6, the action of the analog output voltage which is generated between the terminals a and b and which depends upon the rotational deviation of the spindle 7 will be described in connection with the centrally located reactor $SRA_2$ shown in FIG. 4(a). When the magnetic body 10a is remote from the saturable reactor $SRA_2$ so that the external magnetic field acting upon the reactor has a value approaching zero, the high-frequency pulse signal HFP acts about the vertical zero line of the reactor B-H curve, as shown in FIG. 9(a). In other words, the number of lines of flux cutting the coils $L_1$ and $L_2$ are equal, so that the output voltages from the terminals TB and TC are equal in amplitude but displaced in phase by 180 degrees. It should be noted that the core forming each saturable reactor $SRA_2$ has a hysteresis characteristic which is so small as to be negligible. Since the voltages from the terminals TB and TC are rectified by the respective half-wave rectifiers $HWR_1$ and $HWR_2$, the potentials at the terminals a and b are equal, so that the voltage across a and b is zero. Now, as the spindle 7 rotates and the magnetic body 10a approaches the centrally located saturable reactor $SRA_2$, the external magnetic field $H_{ext}$ being generated by the magnetic body begins to act upon the saturable reactor $SRA_2$. If we let $h_f$ denote the field generated by the high-frequency pulse signal HFP, a flux of $h_f - H_{ext}$ will cut the coil $L_1$, as shown in FIG. 6B, and a flux of $h_f + H_{ext}$ will cut the coil $L_2$. If this is expressed using a B-H curve, the high-frequency pulse signal HFP will act about the line $-H_{ext}$ with respect to the coil $L_1$, as shown in FIG. 6(c), and about the line $+H_{ext}$ with respect to the coil $L_2$, as depicted in FIG. 6(d). Therefore, the negatively directed flux which cuts the coil $L_1$ causes saturation of the core so that there is a smaller amount of amplitude variation, whereas the negatively directed flux which crosses the coil $L_2$ does not cause saturation so that there is a greater amount of amplitude variation. In view of the fact that the induced voltage e takes on the value $(-Nd\phi/dt)$ (where N is the number of turns), the potential at the terminal b will become greater than the potential at terminal a, giving rise to a potential difference between the terminals. This potential difference will vary in the manner of the fine position deviation signal $DV_2$ shown in FIG. 4(c) and, as the magnetic body $10a$ continues to rotate, will become zero when the center of the magnetic body $10a$ coincides with the center line of the saturable reactor $SRA_2$. The result is an analog voltage signal having maximum and minimum values. Similarly, the saturable reactors $SRA_1$ and $SRA_3$ on the left and right sides of the sensing portion $10b$, respectively, and the two half-wave rectifiers associated with each reactor, cooperate to generate a potential difference across the terminals a, b of each corresponding circuit. This potential difference also defines an analog voltage signal and similar to that of the fine position deviation signal $DV_2$, having maximum and minimum values. Thus, the analog voltage signals associated with the reactors $SRA_1$ and $SRA_3$ also depend upon the rotation of the magnetic body $10a$ on the spindle 7.

Figure 4C:
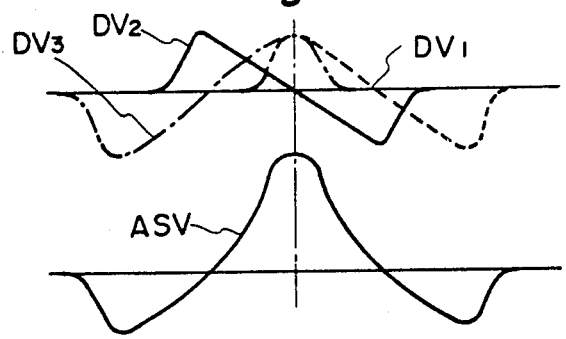
FIG. 4(c) is a waveform diagram of output signals associated therewith.

The electrical circuit $10c$ of the position sensor 10 further includes a conversion circuit for generating a signal $DV_3$, shown in FIG. 4(c), by subjecting to a 180-degree phase conversion the analog voltage signal which is generated by the saturable reactor $SRA_3$ and which varies in dependence upon the rotational movement of the magnetic body $10a$. The electrical circuit $10c$ also includes a circuit which generates the approach signal ASV, also shown in FIG. 4(c), by adding together the signal $DV_3$ and the analog voltage signal, denoted by $DV_1$, which is generated by the saturable reactor $SRA_1$ and which varies in dependence upon the rotational movement of the magnetic body $10a$. The approach signal ASV indicates that a specified point on the spindle 7 has reached a point in the environs of the predetermined rotational position.

Figure 7:
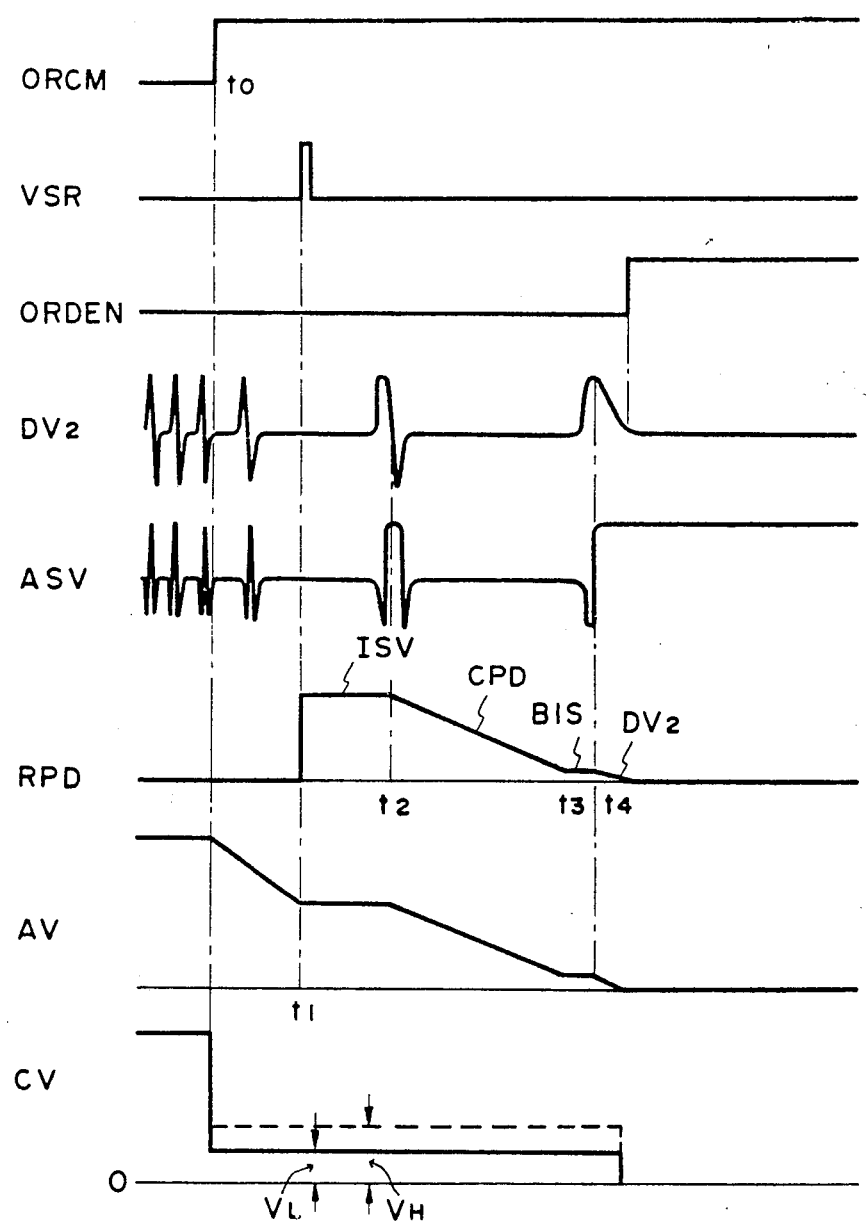
FIGS. 7(a) and 7(b) are waveform diagrams associated with the control system of the present invention.

The operation of the rotational position deviation signal generating circuit $11a$ will now be described with reference to FIGS. 2 and 7(a).

The rotational position deviation signal generating circuit $11a$, shown in FIG. 2, receives the fine position deviation signal $DV_2$, the approach signal ASV output by the position sensor 10 and the actual speed signal AV output by the tachometer 5. The actual speed signal AV is integrated within the circuit $11a$, and the output signal resulting from the integration operation is subtracted from a yet to be described initially set voltage ISV ($-V_i$ when the spindle is rotating in the forward direction and $+V_i$ when the spindle is rotating in the reverse direction). Thus, the signal AV is converted into a coarse position deviation signal CPD. Further, the initially set voltage ISV and a bias signal BIS, shown in FIG. 7(a), are generated within the rotational position deviation signal generating circuit $11a$. The voltage value $V_i$ of the voltage ISV has been set so that it is equal to a rotational position deviation which corresponds to one revolution (360°) of the spindle when in the high gear setting.

In accordance with an orientation command signal ORCM from the orientation command circuit 2, the speed command CV becomes either a voltage corresponding to the speed $V_H$ at which point the spindle stopping mode begins as shown in FIG. 1(a) for the high gear condition, or becomes a voltage corresponding to the speed $V_L$ at which point the spindle stopping mode begins; as shown in FIG. 1(b) for the low gear condition. Accordingly, when the rotational speed of the spindle 7 falls and reaches the command speed, the signal VSR, indicating that the prescribed speed has been reached, goes to logical "1". When this occurs, the rotational position deviation signal generating circuit $11a$ generates the initially set voltage ISV from the time that the signal VSR goes to logical "1" until the time $t_2$ at which the spindle initially reaches the predetermined rotational position. The initially set voltage ISV will, of course, differ between the low and high gear settings. For example, it is obvious that ISV will correspond to $V_H$ in the high gear condition and to $V_L$ in the low gear condition. Furthermore, it will be assumed that the spindle is rotating in the forward direction at the time that it is to be stopped at the predetermined rotational position.

As the spindle continues to rotate and the magnetic body $10a$ (the specified point on the spindle) approaches the predetermined rotational position for the second time, the coarse position deviation signal CPD, whose polarity will be negative, is generated until the magnetic body $10a$ draws near to the area NCP (defined between $-\theta_1$ and $+\theta_1$) in the environs of the predetermined rotational position, that is, until it arrives at the position $-\theta_2$. Furthermore, the bias signal BIS is generated until the above-mentioned area NCP is reached. The fine position deviation signal $DV_2$ is generated after the magnetic body $10a$ has reached the point NCP in the environs of the predetermined rotational position. The result of these operations is generation of the rotational position deviation signal RPD, whose polarity is negative, which is shown in FIG. 7(a). It should be noted that the bias signal waveform BIS may be excluded from the signal RPD by setting $\theta_2$ equal to $\theta_1$.

If the spindle is to be stopped at the predetermined rotational position while rotating in the reverse direction, $+V_i$ is generated as the initially set voltage signal ISV, a coarse position deviation signal of a positive polarity is provided as the signal CPD, and $+V_j$ is generated as the signal BIS. The result is the bias rotational position deviation signal RPD having a positive polarity.

The operation of the control circuit of FIG. 5 for stopping the spindle at a predetermined rotational position, will now be described with reference to FIGS. 5 and 7(b) for a case in which the spindle 7 is rotating in the forward direction. It should be noted that the rotational position deviation signal RPD in FIG. 7(b) is shown as its absolute value.

During rotation of the spindle the changeover switch 12 is connected to the a side in FIG. 2, thereby creating a speed control loop. More specifically, the adder $3a$ receives the speed command signal CV and the actual speed signal AV from the tachometer 5, and responds by generating a rotational speed deviation voltage. The voltage-to-phase converter $3c$ controls the firing angle of the thyristors in the thyristor converter $3d$ in dependence upon the speed deviation voltage, so that the thyristor converter $3d$ regulates the voltage applied to the DC motor 4. As a result, the actual speed of the motor 4 is regulated to bring it into coincidence with the command speed. Therefore the speed control loop regulates the speed of the motor in order to rotate the spindle at approximately the commanded speed.

When the machining work is completed under these conditions, a control device, such as a numerical control device, instructs the orientation command circuit 2 to apply the orientation command signal ORCM to the loop changeover circuit $11b$ at the time $t_0$, shown in FIG. 2, in order to place this circuit in the set state. At the same time, the orientation command signal ORCM is applied to the speed command circuit 1, so that the speed command CV becomes a voltage corresponding to $V_H$ or $V_L$. The actual speed of the spindle consequently decreases and follows the speed command CV. When the actual speed coincides with the value of the speed command, the signal VSR is generated within the position deviation signal generating circuit 11a, and causes the loop changeover circuit 11b to change the switch 12 from the side a to the side b, so that circuit operation now changes from speed control to position control. The position deviation signal generating circuit 11a first generates the initially set voltage ISV in response to the signal VSR. As a result, the spindle continues to rotate at the constant speed $V_H$ or $V_L$ even when the control loop is switched over. As the magnetic body 10a continues to rotate and reaches the predetermined rotational position for the first time (time $t_2$), the rotational position deviation signal generating circuit 11a begins generating the coarse position deviation signal CPD. As the spindle continues to rotate and the magnetic body 10a approaches the area NCP in the environs of the predetermined rotational position (time $t_3$), the position deviation signal generating circuit 11a generates the bias signal BIS. Then, when the magnetic body 10a arrives at the above-mentioned area (time $t_4$), the fine position deviation signal $DV_2$ starts being generated. When the signal $DV_2$ has decreased to zero, namely when the central portion of the magnetic body (the specified point on the spindle) is directly confronting the central portion of the saturable reactor $SRA_2$, the spindle stops rotating. This completes positioning control of the spindle.

Reference will now be made to the detailed circuit diagram of FIG. 8 for a complete understanding of the principal portions of the rotational deviation signal generating circuit 11a, and to the associated timing chart of FIG. 9. Portions in FIG. 8 identical with those of FIG. 2 are denoted by like reference characters and are not described again in order to avoid prolixity.

Figure 8:
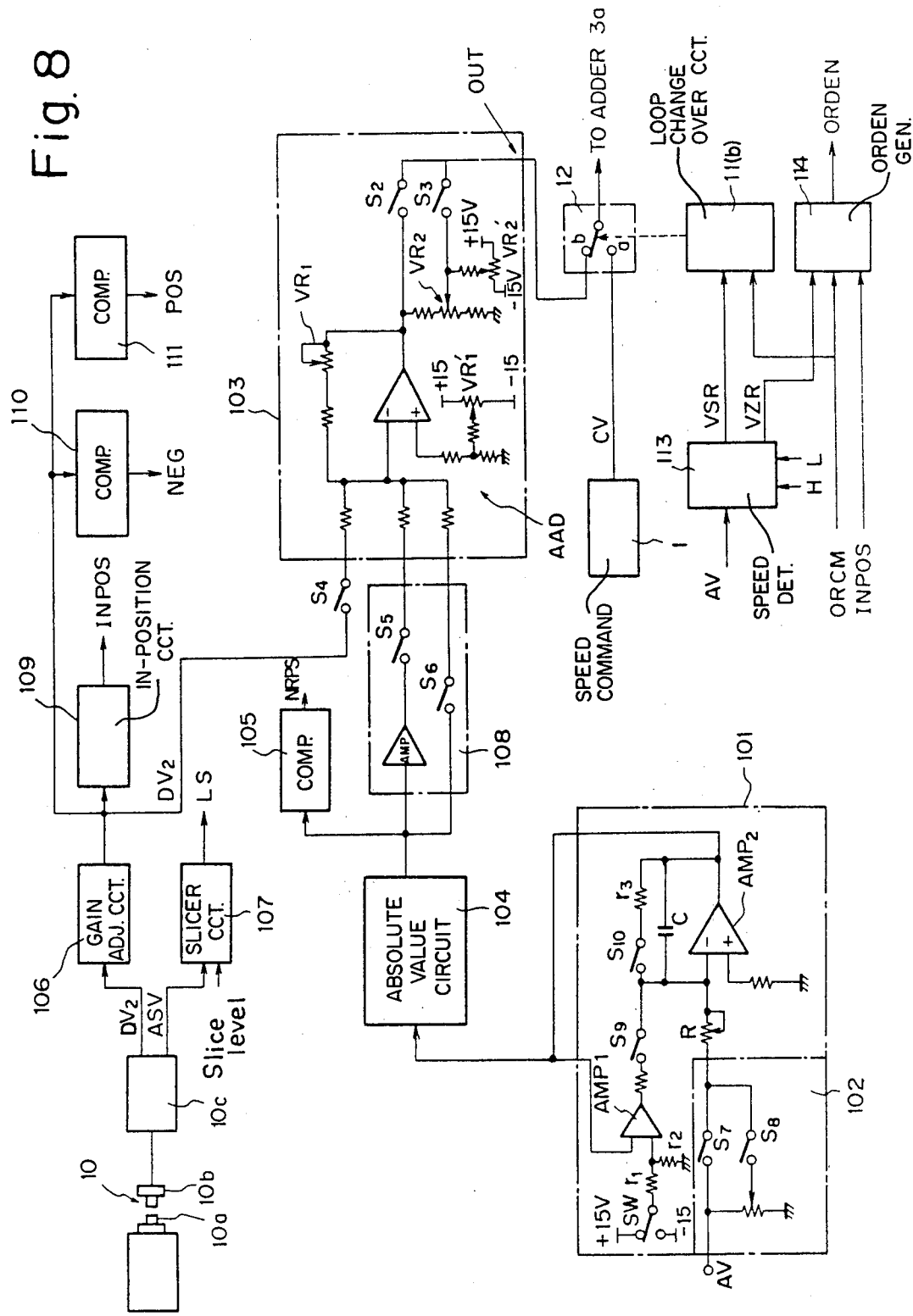
FIG. 8 is a detailed circuit diagram of a principal portion of a rotational position deviation signal generating circuit.
Figure 9:
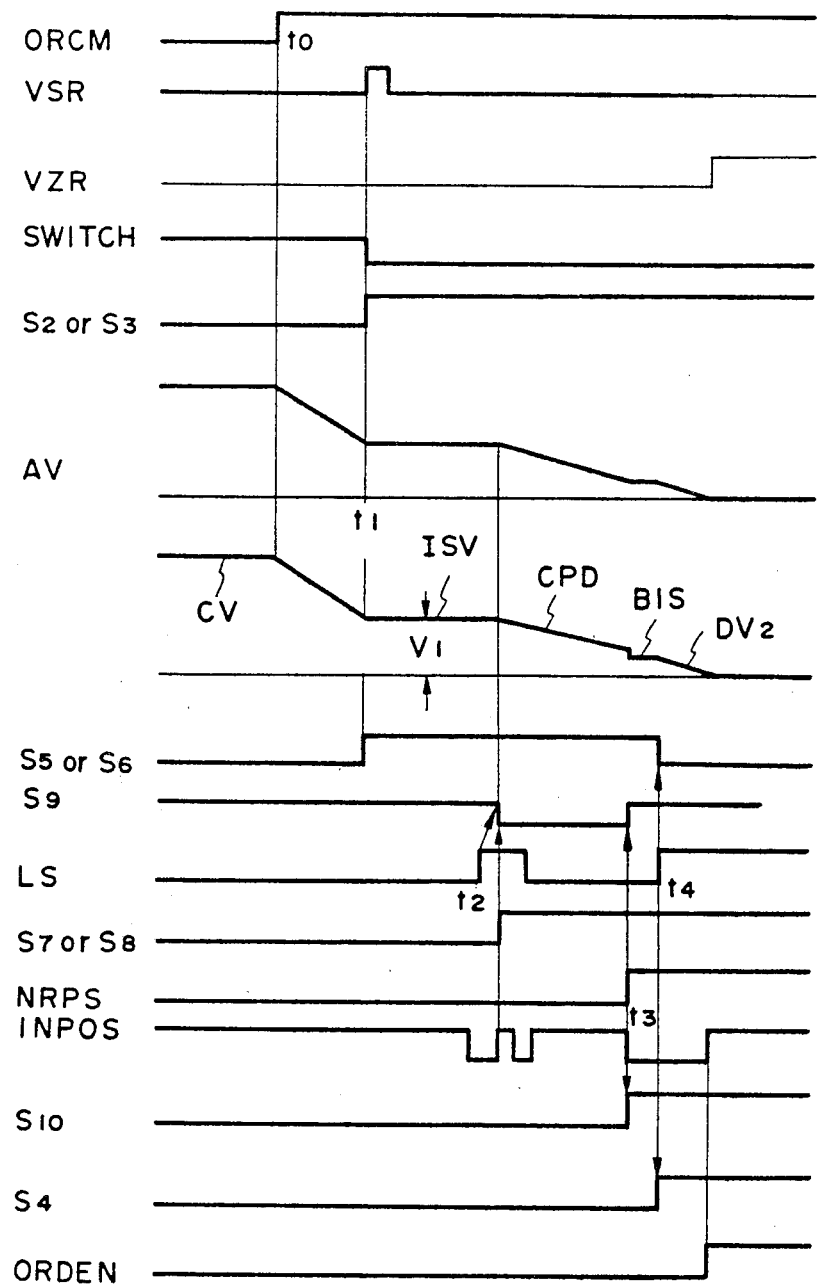
FIG. 9 is a waveform diagram of signals associated with the rotational position deviation signal generating circuit of FIG. 8.

In FIG. 8, a circuit 101 is included to generate the initially set voltage ISV and the bias signal BIS, to integrate the actual speed voltage signal AV, and to subtract the output voltage, resulting from the integration operation, from the initially set voltage ISV. Specifically, a changeover switch SW is switched over to either a +15 volt side or a −15 volt side in accordance with the direction of spindle rotation. If the spindle is rotating in the forward direction, the connection is to the −15 volt side. This voltage is divided by resistors $r_1$, $r_2$, and a capacitor C is charged by an amplifier $AMP_1$, a resistor $r_4$ and a switch $S_9$, the voltage charged in the capacitor becoming the value $V_i$ of the initially set voltage ISV. If the actual speed signal AV enters the circuit 101 through a switch $S_8$ or $S_7$ after the switch $S_9$ has been opened, the capacitor C discharges at the time constant RC since the voltage value of the actual speed signal AV is lower than $V_i$. As a result the coarse position deviation signal CPD, generated due to the subtraction of the output voltage, generated by integrating the actual speed signal AV, from the initially set voltage ISV, appears at the output of the amplifier $AMP_2$. The amplifier $AMP_2$, resistor R and capacitor C comprise an integration circuit. If the switches $S_9$, $S_{10}$ are closed after the voltage of the signal CPD reaches a specified value $V_j$, the circuit 101 acts as an amplifier, and the bias signal BIS at the specified level $V_j$ is generated and appears at the output of the amplifier $AMP_2$. In other words, in accordance with the particular combination and timing of the opening and closing operation of the switches $S_7$ through $S_{10}$, first the initially set voltage ISV is generate, then the coarse position deviation signal CPD, and finally the bias signal BIS.

Blocks 102 and 103 of FIG. 8 denote changeover circuits for switching gain in dependence upon gear ratio. These changeover circuits are operable to set the positioning gain of the position control loop high when the gears between the DC motor 4 and spindle 7 are set low. Specifically, switches $S_7$, $S_2$ are closed to raise the gain when in low gear, and switches $S_8$, $S_3$ are closed to lower the gain when in high gear.

The gain changeover circuit 103 includes: an analog adder AAD; a variable resistor $VR_1$ for adjusting the gain of the adder; a variable resistor $VR_2$ for dividing the output voltage of the adder AAD and for adjusting the dividing ratio; variable resistors $VR_1'$ and $VR_2'$ for adjusting spindle stopping position; and switches $S_2$ and $S_3$. Variable resistor $VR_1$ is for adjusting positioning gain for the low gear setting, and variable resistor $VR_2$ is for adjusting positioning gain for the high gear setting. The variable resistors $VR_1'$ and $VR_2'$ are employed when adjusting the stopping position of the spindle. More specifically, there are instances where the stopping position shifts because of a change in the constant deviation caused by varying the positioning gain in accordance with the high gear/low gear condition. The variable resistors $VR_1'$ and $VR_2'$ are included in order to correct for this shift in stopping position. In accordance with the above arrangement, changing over the gain by means of the changeover circuits 102 and 103 permits the amplitude of the rotational speed deviation voltage RPD, obtained from the output terminal OUT, to be made several times larger in low gear than the amplitude of RPD when in high gear. Thus, it is possible to raise the rotational speed of the spindle motor when in low gear and thus reduce the time required for the spindle positioning control operation.

Block 104 of FIG. 8 is a well-known absolute value circuit which generates the absolute value of the output from the circuit 101. A comparator 105 detects whether or not the coarse position deviation signal CPD has fallen below a predetermined level, and generates a signal NRPS which indicates that the predetermined portion (the magnetic body 10a) has drawn near the area NCP in the environs of the predetermined rotational stopping position. The signal NRPS closes the switches $S_9$, $S_{10}$.

A gain adjustment circuit 106 adjusts the gain in dependence upon the gap between the magnetic body 10a and the sensing portion 10b, and generates the detection voltage $DV_2$ (the fine position deviation voltage) having a prescribed slope. A slicer circuit 107 slices the approach signal ASV at a predetermined level and generates a signal LS which indicates that the magnetic body has reached the area NCP in the environs of the predetermined rotational position. The signal LS opens the switches $S_5$, $S_6$ and closes switch $S_4$. As a result, the fine position deviation signal $DV_2$ is delivered as the deviation signal.

A forward-reverse changeover circuit 108 has a switch $S_5$ closed when the spindle is controlled by rotating it in the forward direction, and a switch $S_6$ closed when the spindle is controlled by rotating it in the reverse direction. An "in-position" signal generating circuit 109, comprising a comparator, monitors the fine position deviation signal $DV_2$ and generates the in-position signal INPOS when the spindle is within range of the predetermined rotational position. Thereafter a signal indicating completion of the orientation operation is transmitted to the numerical control unit.

Comparators 110 and 111 of FIG. 800 monitor the fine position deviation signal $DV_2$ and generate signals NEG and POS, respectively upon detecting whether the spindle is approaching the predetermined rotational direction while rotating in the reverse direction (signal NEG at logical "1") or while rotating in the forward direction (signal POS at logical "1"), respectively. One of the switches $S_5$ or $S_6$ will be closed and the other switch will be opened by the signals VSR and LS depending upon which of the signals NEG or POS is a "1". The analog adder AAD of the gain changeover circuit 103 generates either the fine position deviation signal or the coarse position deviation signal in accordance with the open or closed state of the switches $S_4$, $S_5$ or $S_6$. A speed detection circuit 113 receives the voltage AV indicative of the actual speed of the spindle and, in the high or low gear condition, generates the signal VSR when the actual speed reaches the prescribed speed, and generates a zero speed signal VZR when the actual speed reaches zero. An orientation completion signal generating circuit 114 receives the in-position signal INPOS, the zero speed signal VZR, and the orientation command signal ORCM, and takes the logical product of these signals. In other words, the orientation completion signal ORDEN is generated when INPOS, VZR and ORCM are all at logical "1".

In summary, if the orientation command signal ORCM goes to logical "1" at time $t_0$, the voltage indicative of the command speed CV decreases, and so does the actual speed AV, with AV becoming $V_i$ at time $t_1$. At this time the signal VSR, indicative of the fact that the specified speed has been reached, goes to logical "1", switch 12 is switched, one of the switches $S_2$ or $S_3$ is closed in accordance with the low/high setting of the gears, and one of the switches $S_5$, $S_6$ is closed in accordance with the direction, either forward or reverse, of spindle rotation. This forms a position control loop, with the initially set voltage ISV ($=V_i$) being output by the changeover switch 12 when in high gear, and $K \cdot V_i$ ($K>1$) being generated when in the case of low gear. (It should be noted that switch $S_9$ is closed, and that switches $S_7$, $S_8$, $S_{10}$ are open).

As a result, the DC motor continues rotating at a constant speed corresponding to $V_i$ or to $K \cdot V_i$ and the spindle reaches the predetermined rotational position the first time (i.e., the signal LS is a "1", and the signal INPOS is a "1"). Hence, at time $t_2$, switch $S_9$ is opened and one of the switches $S_7$, $S_8$ is closed in dependence upon the low/high setting of the gears. Therefore the coarse position deviation signal CPD is output by the changeover switch 12. Thereafter, as the actual speed and the position deviation decrease and the spindle approaches a point in the environs of the predetermined rotational position (time $t_3$), the comparator 105 generates the signal NRPS (logical "1), causing the switches $S_9$, $S_{10}$ to be closed. As a result, the bias signal BIS at the prescribed level is output by the changeover switch 12. As the spindle continues to rotate at the slower speed and reaches the area NCP in the environs of the predetermined rotational position (time $t_4$), the signal LS goes to the "1" level, switches $S_5$, $S_6$ are opened, and switch $S_4$ is closed. Hence, the fine position deviation signal $DV_2$ is output by the changeover switch 12. When the magnetic body 10a (the predetermined point on the spindle) comes within range of the predetermined rotational position, the in-position signal INPOS is generated. This is followed by the actual speed of the spindle falling to zero, whereupon the zero speed signal VZR goes to logical "1". This completes the control operation for stopping the spindle at the predetermined rotational position, the orientation completion signal ORDEN being generated by the orientation completion signal generating circuit 114.

It should be noted that overshooting and hunting occur when the positioning gain exceeds a threshold value in the vicinity of the command value. This will be explained with reference to FIG. 10.

Figure 10:
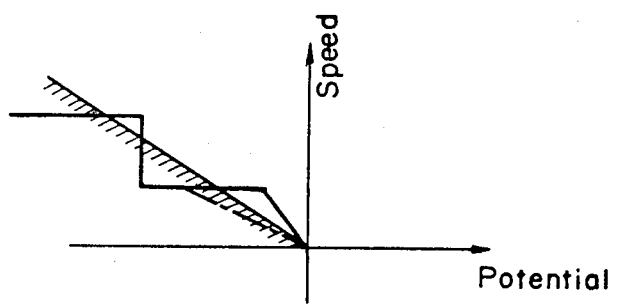
FIG. 10 is an illustrative view which is useful in describing the relationship between positioning gain and overshoot.

The shaded portion in FIG. 10 represents a threshold region within which overshooting does not occur. The solid line represents a case in which the positioning gain exceeds the threshold in the vicinity of the command value, and the broken line represents a case in which the positioning gain does not exceed the threshold in the vicinity of the command value. Overshooting occurs in the former case but not in the latter. It follows then that the foregoing should be considered when setting the positioning gain.

In accordance with the present invention as described above, the positioning gain can be held constant regardless of the high or low gear setting, thereby allowing a marked reduction in the time needed to achieve positioning of the spindle at the predetermined location under a low gear condition. This in turn permits an increase in the proportion of time actually used for machining, so that working efficiency can be enhanced.

While the present invention has been described for a case in which gears are employed as the speed change mechanism, it is obvious that the invention can be applied to a clutch-type speed changer or the like. Moreover, the position sensor described above is not limited to the magnetic sensor. Suitable position sensors include position coders, resolvers and the like.

Although the present invention has been described in its preferred form with a certain degree of particularity, it is obvious that many modifications and variations are possible in light of the above teachings. It is therefore to be understood that within the scope of the appended claims, the invention may be practiced otherwise than as specifically described.

What we claim is:

1. A control system for stopping a spindle at a predetermined rotational position, for driving a spindle with a spindle motor through a speed change mechanism, having a speed change ratio, in such a manner that a positional deviation between a present rotational position of a specified point on the spindle and the predetermined rotational position at which the specified point is to be stopped, is reduced to zero, thereby stopping the specified point on the spindle at the predetermined rotational position, said control system comprising means, operatively connected to the spindle and to the spindle motor, for generating a positioning gain by dividing the speed of the spindle motor by an amount of spindle motor rotation which depends upon the positional deviation of the spindle, said positioning gain being generated so as to remain substantially constant regardless of the speed change ratio established between the spindle motor and the spindle by said speed change mechanism, thereby stopping the specified point on the spindle at the predetermined rotational position.

2. A control system according to claim 1, wherein said means for generating said positioning gain generates said positioning gain by dividing the speed of the spindle motor, one revolution before the specified point on the spindle reaches the predetermined rotational position, by an amount of spindle motor rotation required for one revolution of the spindle, and said positioning gain is so generated as to remain substantially constant.

3. A control system according to claim 1 or 2, wherein said control system has a spindle stopping control mode, wherein said means for generating said positioning gain generates said positioning gain that is finely adjustable during the spindle stopping control mode.

4. A control system, operatively connectable to receive an orientation command signal, for stopping a spindle at a predetermined rotational position, and for driving a spindle through a speed change mechanism, so that a specified point on the spindle is stopped at the predetermined rotational position, said control system comprising:
   actual speed means for generating an actual speed signal;
   a speed command circuit for generating a speed command signal;
   means, coupled to the spindle, for detecting the rotation of the spindle and for generating a deviation signal and an approach signal;
   an orientation control circuit, having a first input operatively connected to said detecting means, having a second input operatively connected to said actual speed means and having a third input operatively connectable to receive the orientation command signal, for generating a rotational position deviation signal, an orientation completion signal and a loop changeover signal; and
   a loop changeover switch, having a first switchable terminal operatively connected to said orientation control circuit and having a second switchable terminal operatively connected said speed command circuit, for outputting the speed command signal or the rotational position deviation signal in dependence upon the loop changeover signal.

5. A control system according to claim 4, wherein said orientation control circuit is operatively connectable to receive high and low gear signals, wherein said spindle rotates in a forward and a reverse direction, wherein said means for detecting the rotation of the spindle includes a magnetic body mounted on the spindle and a sensor positioned opposite the magnetic body and having a gap therebetween, wherein said orientation control circuit comprises:
   a gain adjustment circuit, operatively connected to said detecting means, for receiving the deviation signal, for adjusting the gain in dependence upon the gap between the magnetic body and the sensor and for generating a fine position deviation signal;
   a slicer circuit, operatively connected to said detecting means, for slicing the approach signal at a predetermined level and for generating an a first switching signal which indicates that the magnetic body has reached a predetermined point near the predetermined rotational position;
   means, operatively connected to said gain adjustment circuit, for generating an in-position signal when the fine position deviation signal is within a predetermined range;
   a first comparator, operatively connected said gain adjustment circuit, for comparing the fine position deviation signal with a direction reference signal and for generating a reverse signal when the spindle is approaching the predetermined rotational position while rotating in the reverse direction;
   a second comparator, operatively connected said gain adjustment circuit, for comparing the fine position deviation signal with the direction reference signal and for generating a forward signal when the spindle is approaching the predetermined rotational position while rotating in the forward direction;
   a first changeover circuit, operatively connected to said actual speed means and operatively connectable to receive the low and high gear signals, for switching the gain applied to the actual speed signal in dependence upon the low gear and high gear signals;
   signal means, operatively connected to said first changeover circuit, for generating an initially set voltage signal, a bias signal and a coarse deviation signal, for integrating the actual speed signal received from said first changeover circuit and for substracting the result of the integration from the initially set voltage signal;
   an absolute value circuit, operatively connected to said signal means, for receiving the initially set voltage signal, the coarse position deviation signal and the bias signal, and for generating an absolute value signal;
   a third comparator circuit, operatively connected to said absolute value circuit, for comparing the absolute value signal with a predetermined signal and for generating a second switching signal when the absolute value signal is less than the predetermined signal;
   a forward reverse changeover circuit, having first and second inputs operatively connected to said absolute value circuit and having first and second outputs, for generating an amplified absolute value signal or for passing therethrough the absolute value signal in dependence upon the direction of rotation of the spindle;
   a switch, operatively connected to said gain adjustment circuit and to said slicer circuit, for passing therethrough the fine position deviation signal in dependence upon the first switching signal;
   a second changeover circuit, having a first input operatively connected to said switch, having second and third inputs operatively connected to said forward reverse changeover circuit and having an output operatively connected to said loop changeover circuit, for receiving the fine position deviation signal, for receiving the amplified absolute value signal, for receiving the absolute value signal and for generating the rotational position deviation signal;
   a speed detection circuit, operatively connected to said actual speed means and operatively connectable to receive the high and low gear signals, for generating a predetermined speed signal indicating that the spindle has reached a predetermined speed and for generating a zero speed signal when the spindle stops rotating;
   a loop changeover circuit, operatively connected to said speed detection circuit, to said loop changeover switch and operatively connectable to receive the orientation command signal, for generating the loop changeover signal when the predetermined speed signal and the orientation command signal are present; and an orientation completion signal generating circuit, operatively connected to said speed detection circuit, to said means for generating the in-position signal and operatively connectable to receive the orientation command signal, for generating the orientation completion signal when the zero speed signal, the orientation command signal, and the in-position signal are present.

6. A control system according to claim 5, wherein said first changeover circuit comprises:
   a variable resistor, having a first terminal operatively connected to said actual speed means, having a second terminal operatively connected to ground and having a third terminal for outputting a modified actual speed signal;
   a first switch, operatively connected to said actual speed means, to said signal means and operatively connectable to receive the low gear signal, for passing the actual speed signal therethrough when the low gear signal is received; and
   a second switch, operatively connected between the third terminal of said variable resistor and said signal means and operatively connectable to receive the high gear signal, for passing therethrough the modified actual speed signal when the high gear signal is received.

7. A control system according to claim 5, wherein said signal means comprises:
   a changeover switch, having first and second switchable terminals operatively connected to first and second reference voltages, respectively, for switching between the first and second reference voltages in dependence upon the direction of rotation of the spindle;
   a first resistor having a first terminal operatively connected to said changeover switch and having a second terminal;
   a first amplifier having a first input operatively connected to the second terminal of said first resistor, having a second input and having an output;
   a second resistor having a first terminal operatively connected to the output of said first amplifier and having a second terminal;
   a first switch, operatively connected to said third comparator, having a switchable terminal operatively connected to the second terminal of said second resistor and having a nonswitchable terminal, said first switch closing when the second switching signal is received;
   an integration circuit, having a first input operatively connected to the nonswitchable terminal of said first switch, having a second input operatively connected to said first changeover circuit and having an output operatively connected to the second input of said first amplifier and to said absolute value circuit, for generating the initially set voltage, the coarse position deviation signal and the bias signal;
   a third resistor having a first terminal operatively connected to the output of said integration circuit and having a second terminal; and
   a second switch, operatively connected to said third comparator and operatively connected between the second terminal of said third resistor and the first input of said integration circuit, said second switch closing when the second switching signal is received.

8. A control system according to claim 7, wherein said signal means further comprises a fourth resistor operatively connected between the second terminal of said first resistor and ground.

9. A control system according to claim 7, wherein said integration circuit comprises:
   a variable resistor having a first terminal operatively connected to said first changeover circuit and having a second terminal;
   a second amplifier, having a negative input operatively connected to both the second terminal of said variable resistor and the nonswitchable terminal of said first switch and having an output operatively connected to said absolute value circuit, for generating the initially set voltage signal, the bias signal and the coarse deviation signal; and
   a capacitor operatively connected between the negative input and the output of said second amplifier.

10. A control system according to claim 9, wherein said second amplifier has a positive input, wherein said integration circuit further comprises a resistor operatively connected between the positive input and ground.

11. A control system according to claim 5, wherein said forward-reverse changeover circuit comprises:
   an amplifier, operatively connected to said absolute value circuit and to said second changeover circuit, for generating the amplified absolute value signal;
   a first forward reverse switch, operatively connected to said amplifier, to said second changeover circuit, to said speed detection circuit, to said first comparator and to said slicer circuit, for passing therethrough the amplified absolute value signal in dependence upon the predetermined speed signal, the reverse signal, the forward signal and the first switching signal; and
   a second forward reverse switch, operatively connected to said second changeover circuit, to said absolute value circuit to said speed detection circuit, to said first comparator and to said slicer circuit, for passing therethrough the absolute value signal in dependence upon the predetermined speed signal, the reverse signal, the forward signal and the first switching signal.

12. A control system according to claim 5, wherein said second changeover circuit comprises:
   first and second means for generating first and second correction signals, respectively;
   an adder circuit, having a first input operatively connected to said switch, having second and third inputs operatively connected to said forward-reverse changeover circuit, having a fourth input operatively connected said means for generating the first correction signal and having an output, for adding the first correction signal to the fine position deviation signal, to the amplified absolute value signal or to the absolute value signal in dependence upon which signal is received, and for generating an adder signal; and
   means, operatively connected to the output of said adder and operatively connected to said second means for generating the second correction signal, to said loop changeover switch and operatively connectable to receive the high and low gear signals, for dividing the adder signal, for adjusting a dividing ratio, for adjusting gain in dependence upon the high or low gear signals, for modifying the adder signal in dependence upon the second correction signal and for generating the rotational position deviation signal.

13. A control system as recited in claim 12, wherein said adder circuit comprises:
first through third resistors, each having a first terminal operatively connected to said switch and to said forward reverse changeover circuit, respectively, and each having a second terminal;
an amplifier having a first input operatively connected to the second terminal of said first through third resistors, having a second input and having an output operatively connected to said driver means;
a variable resistor having a first terminal operatively connected between the first input and the output of said amplifier and having a second terminal; and
fourth and fifth resistors operatively connected in series between the second input of said amplifier and ground, a connection point formed between said fifth and sixth resistors operatively connected to said first means for generating the first correction signal.

14. A control system according to claim 12, wherein said first and second means for generating the first and second correction signals each comprise a variable resistor having a first input operatively connected to a first reference voltage, having a second input operatively connected to a second reference voltage and having an output.

15. A control system according to claim 12, wherein said means for dividing the adder signal, for adjusting the dividing ratio, for adjusting the gain and for modifying the adder signal in dependence upon the second correction signal comprises:
a first resistor having a first terminal operatively connected to the output of said adder circuit and having a second terminal;
a variable resistor having a first terminal operatively connected to the second terminal of said first resistor, having a second terminal and having a third terminal;
a second resistor operatively connected between the second terminal of said variable resistor and ground;
a first switch, operatively connectable to receive the low gear signal, having a first terminal operatively connected to the output of said adder circuit and having a second terminal operatively connected to said loop changeover switch, for outputting the rotational position deviation signal, wherein said first switch closing in dependence upon the low gear signal; and
a second switch, operatively connectable to receive the high gear signal, having a first terminal operatively connected to the third terminal of said variable resistor and to said second means for generating a second correction signal and having a second terminal operatively connected to said loop changeover circuit, for outputting the rotational position deviation signal, wherein said second switch closing in dependence upon the high gear signal.

* * * * *

UNITED STATES PATENT AND TRADEMARK OFFICE
CERTIFICATE OF CORRECTION

PATENT NO. : 4,374,350
DATED : February 15, 1983
INVENTOR(S) : Yoshinori Kohzai et al It is certified that error appears in the above-identified patent and that said Letters Patent is hereby corrected as shown below:

Front page, [57] ABSTRACT, line 16, after "signal", insert --,--;
line 17, after "position", insert --,--;
line 24, ";" should be --,--.

Column 1, line 13, "of" should be --for--;
line 49, after "of", insert --the--.

Column 3, line 14, delete "are", first occurrence.

Column 4, line 33, delete "adapted";
line 53, delete "and";
line 56, delete "a".

Column 5, line 15, "the" should be --The--;
line 37, delete "also".

Column 6, line 7, delete "with";
line 50, "$h_2$" should be --$h_1$--;
line 52, "$h_2$" should be --$h_1$--;
line 64, "e" should be --$\underline{e}$--;
line 65, "b" should be --$\underline{b}$--;
line 66, "a," should be --$\underline{a}$,--.

Column 7, line 10, "," should be --and--;
line 12, "and" should be --,--;
line 63, "1(b)" should be --1(b),--;
";" should be --,--.

UNITED STATES PATENT AND TRADEMARK OFFICE
CERTIFICATE OF CORRECTION

PATENT NO. : 4,374,350  
DATED : February 15, 1983  
INVENTOR(S) : Yoshinori Kohzai et al Page 2 of 2

It is certified that error appears in the above-identified patent and that said Letters Patent is hereby corrected as shown below:

Column 8, line 35, after "the", insert --bias--; and delete bias;
line 46, "a" should be --$\underline{a}$--.

Column 10, line 1, "generate" should be --generated--.

Column 11, line 3, "800" should be --8--;
line 5, ", respectively" should be --, respectively,--;
line 42, delete "case of".

Column 13, line 57, delete "an".

Signed and Sealed this

Twenty-ninth Day of November 1983

[SEAL]

Attest:

GERALD J. MOSSINGHOFF

Attesting Officer

Commissioner of Patents and Trademarks